US010184827B2

(12) United States Patent
Peng et al.

(10) Patent No.: US 10,184,827 B2
(45) Date of Patent: Jan. 22, 2019

(54) NEAR-INFRARED ABSORBING FILTER AND IMAGE SENSOR

(71) Applicant: Platinum Optics Technology Inc., Taoyuan (TW)

(72) Inventors: Hsin-Miau Peng, Taoyuan (TW); Chung-Han Lu, Taoyuan (TW); Liang-Yu Yen, Taoyuan (TW)

(73) Assignee: Platinum Optics Technology Inc., Taoyuan (TW)

( * ) Notice: Subject to any disclaimer, the term of this patent is extended or adjusted under 35 U.S.C. 154(b) by 275 days.

(21) Appl. No.: 15/299,113

(22) Filed: Oct. 20, 2016

(65) Prior Publication Data

US 2017/0322076 A1 Nov. 9, 2017

(30) Foreign Application Priority Data

May 4, 2016 (TW) .............................. 105206355 U

(51) Int. Cl.
*G01J 3/50* (2006.01)
*G01J 1/04* (2006.01)
(Continued)

(52) U.S. Cl.
CPC ............ *G01J 1/0488* (2013.01); *G02B 5/208* (2013.01); *G02B 5/223* (2013.01); *G02B 5/226* (2013.01); *G01J 2003/1226* (2013.01)

(58) Field of Classification Search
CPC ....... G01J 1/0488; G02B 5/208; G02B 5/226; G02B 5/223
(Continued)

(56) References Cited

U.S. PATENT DOCUMENTS 6,225,244 B1 * 5/2001 Oguma ..................... C03C 3/16
501/45
7,018,714 B2 * 3/2006 Kobayashi ............. G02B 5/208
250/316.1
(Continued)

FOREIGN PATENT DOCUMENTS

JP 2005126650 A 5/2005
JP 2006220873 A 8/2006
(Continued)

*Primary Examiner* — Georgia Y Epps
*Assistant Examiner* — Kevin Wyatt
(74) *Attorney, Agent, or Firm* — Bookoff McAndrews, PLLC

(57) ABSTRACT

The present disclosure provides a near-infrared absorbing filter, including an absorbing type infrared filtering medium having opposite first and second surfaces; an organic coating layer formed on the first surface of the absorbing type filtering medium for absorbing infrared rays; a first multi-layered film structure formed on the organic coating layer with the organic coating layer disposed between the first multi-layered film structure and the absorbing type infrared filtering medium; and a second multi-layered film structure formed on the second surface of the absorbing type infrared filtering medium. The near-infrared filter of the present disclosure is able to reduce the wavelength difference of T50 and T20 of the incident light within the range of from 0 to 30 degrees to less than 5 nm, thereby reducing chromatic aberration effectively and reducing ghost images of infrared reflections. The disclosure further provides an image sensor including the near-infrared absorbing filter.

17 Claims, 11 Drawing Sheets

(51) Int. Cl.
  *G02B 5/20*  (2006.01)
  *G02B 5/22*  (2006.01)
  *G01J 3/12*  (2006.01)

(58) Field of Classification Search
  USPC ........................................................ 250/226
  See application file for complete search history.

(56) References Cited

U.S. PATENT DOCUMENTS

| | | | | |
|---|---|---|---|---|
| 2011/0152538 A1* | 6/2011 | Mae | ................ | C09B 57/06 |
| | | | | 548/437 |
| 2012/0113505 A1* | 5/2012 | Chen | ................ | G02B 5/208 |
| | | | | 359/359 |
| 2012/0199929 A1* | 8/2012 | Kamijyo | ................ | G02B 5/208 |
| | | | | 257/432 |
| 2015/0260889 A1* | 9/2015 | Shiono | ................ | C08K 5/3417 |
| | | | | 252/587 |

FOREIGN PATENT DOCUMENTS

| | | |
|---|---|---|
| JP | 2012137646 A | 7/2012 |
| TW | 200920709 | 5/2009 |
| TW | 201200485 | 1/2012 |

* cited by examiner

US 10,184,827 B2

NEAR-INFRARED ABSORBING FILTER AND IMAGE SENSOR

CROSS-REFERENCE TO RELATED APPLICATION(S)

This application claims priority to Taiwanese Patent Application No. 105206355, filed on May 4, 2016, the entirety of which is incorporated by reference herein.

BACKGROUND

Technical Field

The present disclosure relates to an optical element, especially a near-infrared absorbing filter applicable for an image sensor.

Description of Related Art

In general, human eyes are capable of sensing visible lights with the range about 400 nm to 700 nm. Invisible light comprises infrared rays with wavelength of from 700 nm to 1200 nm and ultraviolet rays with wavelength of from 10 nm to 400 nm. Infrared rays have no effects on color vision of human beings, but do have effects on photographic devices such as video cameras, cameras, or mobile phone cameras. Generally, a photographic lens is a lens mount configured with a plurality of optical lenses, light filters and image sensing elements, such as a charge-coupled device (CCD) or a complementary metal oxide semiconductor (CMOS) inside the lens mount, and the image sensing element has a high sensitivity which can sense light within a wavelength range of from 400 nm to 1200 nm and capture infrared rays which is invisible. In order to prevent infrared rays from affecting images, a light filter or filtering lens must be mounted in front of the image sensing element to prevent infrared rays from entering the image sensing element, thereby correcting color shift for image. Currently, known light filters include reflecting type light filters and absorbing type light filters.

As shown in FIG. 2A, a reflecting type infrared filter 2 includes a transparent medium 20 such as glass, acrylic (PMMA) and quartz, and a first coating film 22 and a second coating film 24 formed on opposite sides of the transparent medium 20, respectively. Since common glass has a high transmittance (T %) of up to more than 90% for incident light, the coating film is used for reflecting infrared rays with the wavelength of from 700 nm to 1200 nm. However, with the digital image products becoming increasingly lighter, thinner, shorter, and smaller, the incident angle of the light from the light source received by the image sensing element or the optical system would be enlarged. When the incident angle become larger, a large shift of the 50% transmittance (central wavelength, or referred as T50 wavelength) of a reflecting type infrared filter will occur, which exceeds the limit of the image sensing element's white balance so as to cause color shift, thus, the filter is not applicable for 5,000,000 or more pixels lens.

Specifically, when the reflecting type filter is applied in an image sensor, light with a smaller incident angle (e.g., incident angle of 0 degree) will go to the central part of the image sensing element and light with larger incident angle (e.g., incident angle of 30 degrees) will go to the peripheral part of the image sensing element. Hence, the properties of spectral transmittance curves of the incident light vary with the position of the light receiving surface of the image sensing element, which results in different color tones in the central and peripheral parts of an image, i.e., color shift. As shown in FIG. 2B, generally, the coating film on a common reflecting type filter has a T50 wavelength at 650 nm (incident angle of 0 degree) which has a shift value of 30 nm towards short wavelength with the incident angle of 0 to 30 degrees. Since color shift in the range of red light is very serious, it is more difficult to eliminate the ghost image at infrared band if the T50 wavelength of the coating film further shifts towards longer wavelength.

For example, as shown in FIG. 2C, after the incident light L passes through a reflecting type infrared filter 2, since the reflecting type infrared filter 2 cannot reflect all of the infrared rays, some of the infrared rays T still pass through the filter 2 and are sensed by an image sensing element 200, and the infrared rays T are reflected between the filter 2 and the image sensing element 200 repeatedly thereby forming images which results in dazzle light and ghost images. Therefore, T50 wavelength of the coating film on a reflecting type light filter cannot shift towards long wavelength, which further results in the problem of color shift of red light band.

In order to overcome the disadvantages of a reflecting type light filter, an absorbing type infrared filter employs blue glass as an absorbing type infrared filtering medium. As disclosed in TW 200920709 and TW 201200485, blue glass has a natural instinct of lower absorbance and transmittance to the wavelength of red light. As shown in FIG. 3A, an absorbing type infrared filter includes an absorbing type infrared filtering medium 30, and a first coating film 32 and a corresponding second coating film 34 formed on the opposite sides of the medium respectively. Spectral transmittance (T %) curves at different angles (0 and 30 degrees) of an absorbing type infrared filter are shown in FIG. 3B. T50 wavelength of the bare sheet (i.e., the blue glass itself) is 643 nm, T50 wavelength of the coating film is 690 nm (with incident angle of 0 degree), and the color shift reduces to 6 to10 nm when the incident angle changes from 0 degree to 30 degrees. However, there is no effective improvement on color shift of 20% transmittance (T20 wavelength) of the absorbing type infrared filter within the range of from 650 nm to 700 nm. Thus, T50 wavelength of the coating film cannot be shifted towards long wavelength, for example, from 700 nm to 730 nm. Besides, the more layers of the coating films are made, the more time the process costs, and may stain the coating films.

Therefore, it is an urgent issue to figure out how to avoid the ghost images and color shift at various angles occurring when an image is created by the image sensing element, so as to allow the T50 wavelength of the coating film to shift towards long wavelength and to have no influence on the entire transmittance area of visible light passing through the light filter with the shift of 0 degree to 30 degrees and thereby obtaining an image having high color saturation.

SUMMARY

The present disclosure provides a near-infrared absorbing filter, which comprises: an absorbing type infrared filtering medium having opposite first and second surfaces; an organic coating layer formed on the first surface of the absorbing type infrared filtering medium to absorb infrared rays, wherein the organic coating layer has a central wavelength (T50) between 630 nm and 680 nm and has an average transmission ($T_{avg}$) of less than 8% for wavelength in a range of from 700 to 725 nm; a first multi-layered film structure formed on the organic coating layer with the organic coating layer disposed between the first multi-layered film structure and the absorbing type infrared filtering medium, wherein the central wavelength of the first multi-layered film structure is between 700 nm and 730 nm; and a second multi-layered film structure formed on the second surface of the absorbing type infrared filtering medium, wherein the central wavelength of the second multi-layered film structure is between 700 nm and 730 nm.

The present disclosure further provides an image sensor, which comprises: a lens module comprising a lens and the near-infrared absorbing filter of the present disclosure disposed on a light transmission path of the lens; and an image sensing element disposed at one side of the lens module with the near-infrared absorbing filter disposed between the lens and the image sensing element.

According to the near-infrared absorbing filter of the present disclosure, an organic coating layer is formed between the coating film and the absorbing type infrared filtering medium to effectively reduce the transmission of light with wavelength of from 680 nm to 730 nm, to reduce color shift by the structure with the coating film, and further to resolve the problem of ghost images.

BRIEF DESCRIOPTION OF THE DRAWINGS

Figure 3A:
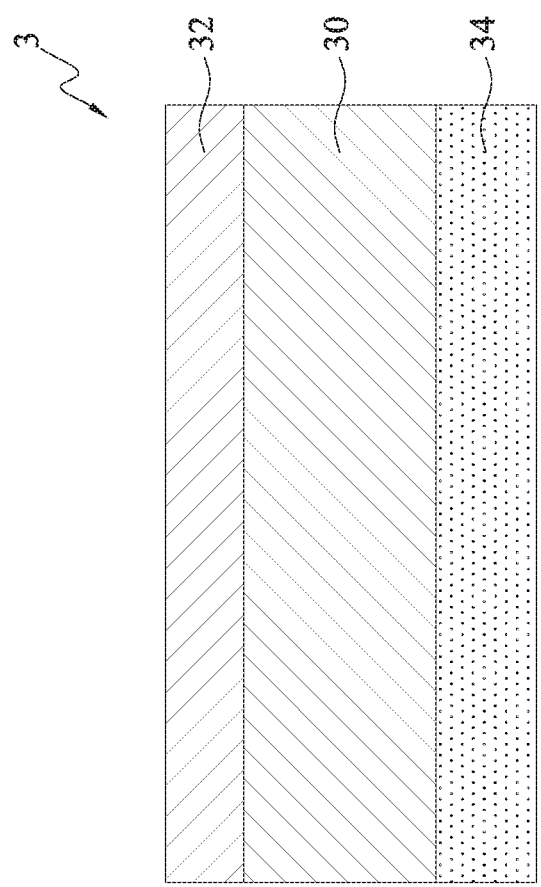
FIG. 3A is a diagram showing a well-known absorbing type infrared filter.
Figure 3B:
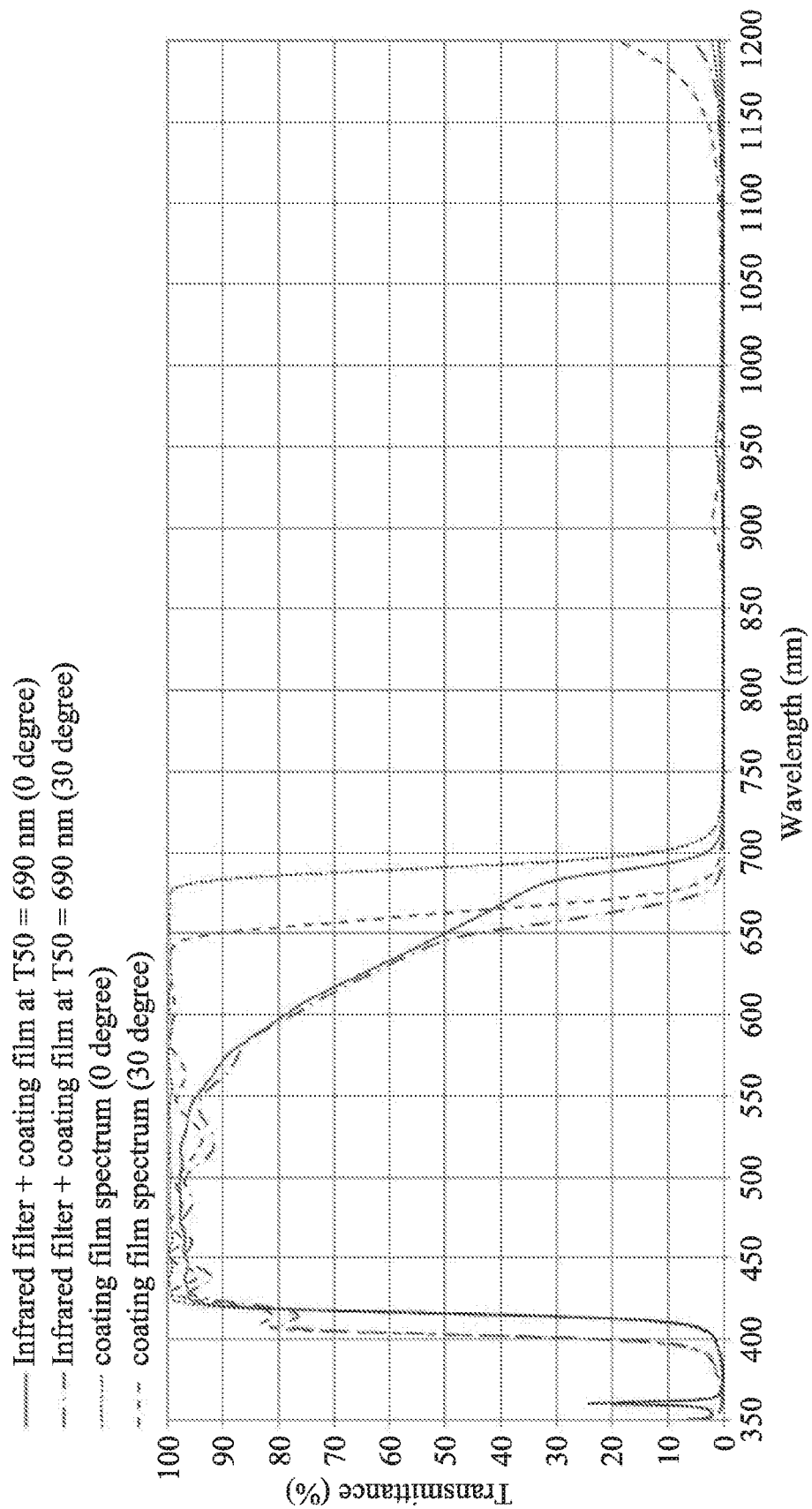
FIG. 3B is a graph showing spectral transmittance (T %) curves of the well-known absorbing type infrared filter at different degrees (0 degree and 30 degrees), wherein the central wavelength of the coating film at 0 degree is 690 nm.
Figure 3C:
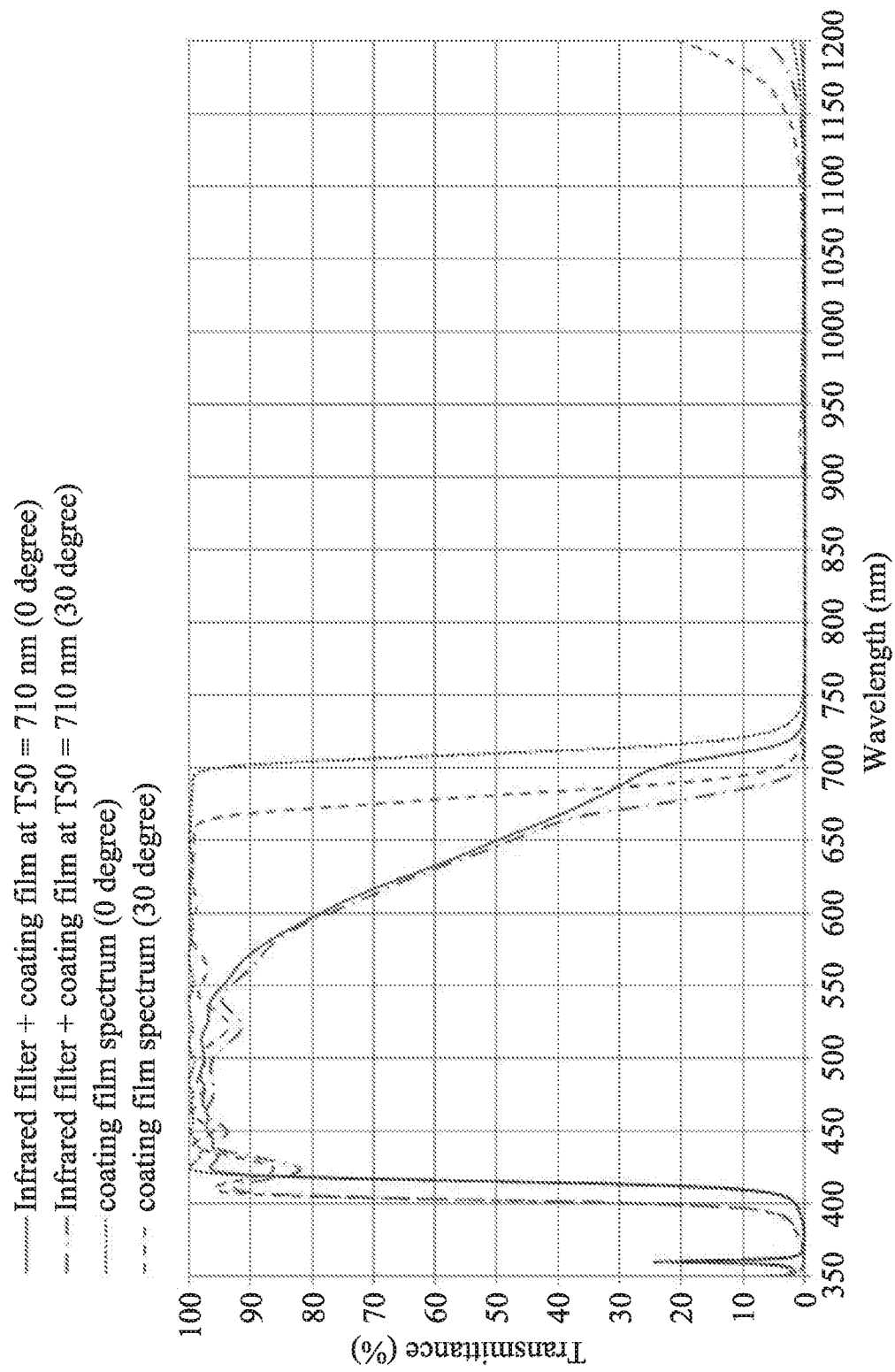
Figure 4:
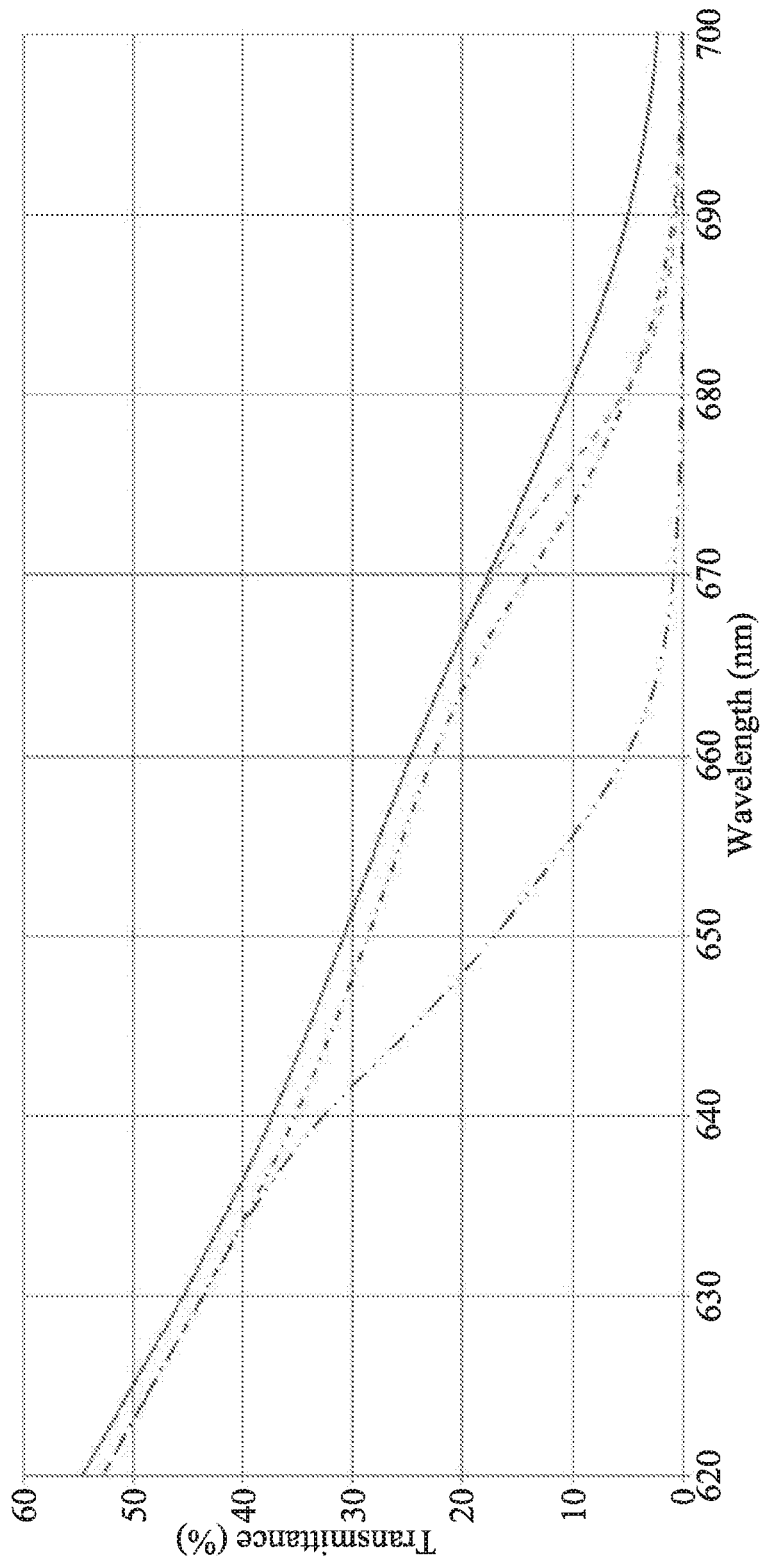

FIG. 3C is a graph showing spectral transmittance (T %) curves of the well-known absorbing type infrared filter at different degrees (0 degree and 30 degrees), wherein the central wavelength of the coating film at 0 degree is 710 nm; and FIG. 4 is a graph showing spectral transmittance (T %) curves at 620 nm to 700 nm of the near-infrared absorbing filter of the present disclosure and the comparative example at different degrees (0 degree and 30 degree).

DETAILED DESCRIPTIONS

The present disclosure will be clearly understood by the following detailed description and exemplified embodiments. These descriptions and embodiments are used to exemplify and illustrate the non-limiting particular example of the present disclosure.

It should be understood that, the structures, ratios, sizes, and the like in the accompanying figures are used to illustrate the content disclosed in the present specification for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present specification. Meanwhile, terms such as "first," "second," "upper," "a," "an," and the like used herein are merely used for clear explanation rather than limiting practical range by the present disclosure, and thus, the alteration or adjustment of relative relationship thereof without essentially altering the technical content should be considered in the practical scope of the present disclosure.

Figure 1A:
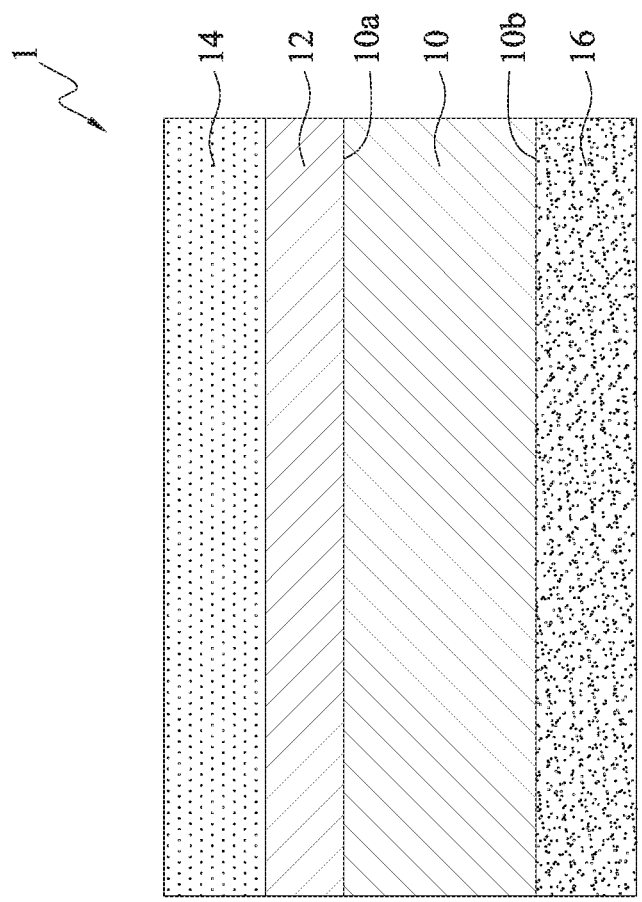
FIG. 1A is a diagram showing the structure of the near-infrared absorbing filter of the present disclosure.

Referring to FIG. 1A, which is an aspect of the disclosure, as shown in FIG. 1A, a near-infrared absorbing filter 1 comprises an absorbing type infrared filtering medium 10 having opposite two surfaces which are a first surface 10a and a second surface 10b; an organic coating layer 12 formed on the first surface 10a of the absorbing type infrared filtering medium 10 to absorb infrared rays, wherein the organic coating layer 12 has a central wavelength (T50) between 630 nm and 680 nm and has an average transmission ($T_{avg}$) of less than 8% for wavelength in a range of from 700 nm to 725 nm; a first multi-layered film structure 14 formed on the organic coating layer 12 with the organic coating layer 12 disposed between the first multi-layered film structure 14 and the absorbing type infrared filtering medium 10, wherein the central wavelength of the first multi-layered film structure is between 700 nm and 730 nm; and a second multi-layered film structure 16 formed on the second surface 10b of the absorbing type infrared filtering medium 10, wherein the central wavelength of the second multi-layered film structure 16 is between 700 nm and 730 nm.

In one aspect of the disclosure, the material of the absorbing type infrared filtering medium is glass, specifically, fluorophosphate-based infrared filter glass or phosphate-based infrared filter glass. The phosphate-based infrared filter glass mainly comprises $P_2O_5$ and other components such as, for example, $Al_2O_3$, CuO, $SiO_2$, MgO, CaO, $K_2O$, BaO, $Li_2O$, $Nb_2O_5$, and ZnO. In one embodiment, the phosphate-based infrared filter glass mainly comprises 40 to 75% of $P_2O_5$, 10 to 28% of $Al_2O_3$, and 3 to 8.5% of CuO.

Fluorophosphate-based infrared filter glass further includes a metal fluoride such as $AlF_3$, LiF, $MgF_2$, $CaF_2$, $SrF_2$ and $BaF_2$. In one embodiment, the fluorophosphates-based infrared filter glass comprises $P_2O_5$, CuO, and at least one fluoride selected from the group consisting of $AlF_3$, LiF, $MgF_2$, $CaF_2$, $SrF_2$, and $BaF_2$. The absorbing type infrared filtering medium is optionally subjected to processes of cutting, grinding, polishing, cold working, etc. Additionally, the absorbing type infrared filtering medium generally has a thickness of 0.15 to 1.5 mm.

In the present disclosure, the organic coating layer is formed by filming a polymer containing an organic pigment having a property of absorbing infrared rays on the first surface 10a of the absorbing type infrared filtering medium 10. During the production process, the organic coating layer can be formed by dissolving or dispersing the polymer in a solvent to formulate a coating solution, adding an organic pigment thereto, coating the coating solution directly on a substrate, and drying. The method for coating can be a known one such as spin coating, gravure coating, spray coating, curtain coating, air blade coating, doctor blade coating, reverse roll coating, and the like. In one embodiment, the organic coating layer is formed by spin coating. Additionally, preferably, the organic coating layer has a thickness of 0.1 to 10 μm. More preferably, the organic coating layer has a thickness of 2 μm.

In one embodiment of the present disclosure, the organic coating layer has a central wavelength (T50) between 630 nm and 680 nm and has an average transmission ($T_{avg}$) of less than 8% at a wavelength in a range of from 700 nm to 725 nm; more specifically, the organic coating layer contains an organic pigment and a polymer, wherein the organic pigment is at least one selected from the group consisting of an azo compound, a diimmonium compound, a dithiophenol-metal complex, a phthalocyanine compound, a squaraine compound, and a cyanine compound. In addition, light radiation within different ranges of wavelength can be absorbed by selecting different organic pigments. The polymer used in the organic coating layer must be capable of keeping the organic pigment being dissolved or dispersed and must be a transparent electric medium at the same time. The polymer can be at least one selected from the group consisting of polyesters, polyacrylates, polyolefins, polycarbonates, polycycloolefins, polyurethanes, epoxy, polyethers, and polyvinyl butyrals. Additionally, it is preferred to choose a crosslinkable polymer, for example, a polymer which cannot be crosslinked originally being modified to have crosslinkable functional groups, thereby becoming a crosslinkable one. In another embodiment, the organic coating layer further comprises a curing agent such as toluene diisocynate (TDI) in an amount of, for example, 15 to 35 wt % based on the solid content in the organic coating layer.

The selection of the organic solvent contained in the coating solution is not particularly limited so long as the organic pigments and polymers described above can be dissolved or dispersed evenly therein. Suitable solvents include, for example, alcohols such as isopropanol; ketones such as acetone, methyl ethyl ketone, methyl isobutyl ketone, cyclopentanone, cyclohexanone, diacetone alcohol, etc.; esters such as ethyl acetate, butyl acetate, methoxyethyl acetate, ethyl acrylate, and butyl acrylate; fluorinated alcohols such as 2,2,3,3-tetrafluoropropanol; hydrocarbons such as hexane, benzene, toluene, and xylene; chlorinate hydrocarbons such as dichloromethane, dichloroethane, and chloroform. The organic solvents can be used alone or in combination.

In order to dissolve or disperse the organic pigments and polymers described above uniformly in an organic solvent, a method, such as stirring, dispersing, cracking and the like at an elevated temperature can be employed.

After the coating solution is coated, a curing process is performed by a known method such as UV curing, hot air curing, heater curing, baking and the like. The curing temperature can be adjusted depending on different solvents. In one embodiment, preferably, 100 to 140° C. (±2° C.) is suggested, and preferably, the curing temperature is controlled within the range of ±2° C. with good precision. The curing time can be adjusted depending on the solvent of coating solution and the coating amount, preferably is 30 minutes.

In the present disclosure, a first multi-layered film structure 14 and a second multi-layered film structure 16 are further comprised, wherein the first multi-layered film structure 14 is formed on the organic coating layer 12 so as to dispose the organic coating layer 12 between the first multi-layered film structure 14 and the absorbing type infrared filtering medium 10, and the second multi-layered film structure 16 is formed on the second surface 10b of the absorbing type infrared filtering medium 10.

Said multi-layered film structure can be an infrared rays reflecting multi-layered film, an ultraviolet-infrared rays reflecting multi-layered film, or an antireflective multi-layered film. For production, the optical properties such as spectral transmittance can be adjusted by different designs of refractive indexes, layers and thicknesses, for example, by alternately laminating materials with high and low refractive indexes, for a multi-layered film structure, generally the laminated layers are 4 to 50 layers, i.e., each of the first multi-layered film structure 14 and the second multi-layered film structure 16 is a film comprising 10 to 30 layers; for an infrared rays reflecting multi-layered film or an ultraviolet-infrared rays reflecting multi-layered film, the thickness of laminated layers is 0.2 to 5 μm; for an antireflective multi-layered film, the thickness of laminated layers is 0.2 to 5 μm. In general, one of the first multi-layered film structure 14 and the second multi-layered film structure 16 is thicker and the other is thinner, and the thinner one is preferably an antireflective multi-layered film. Hence, the first multi-layered film structure 14 has a thickness greater or less than that of the second multi-layered film structure 16, and the thickness is depending on the properties of the film formed, such as an infrared rays reflecting multi-layered film, an ultraviolet-infrared rays reflecting multi-layered film, or an antireflective multi-layered film.

In one embodiment, the multi-layered film structure can be formed on the organic coating layer and/or on the second surface of the absorbing type infrared filtering medium by a vapor phase filming method, wherein the method can be various existing filming means, for example, one of various vacuum filming methods including sputtering, ionization evaporation, electron beam evaporation, and chemical evaporation or a combination thereof. Preferably, the film is formed by electron gun evaporation method with ion-source-assisted.

In one embodiment, the material forming each layers of the film is at least one selected from the group consisting of $TiO_2$, $SiO_2$, $Y_2O_3$, $MgF_2$, $Al_2O_3$, $Nb_2O_5$, $AlF_3$, $Bi_2O_3$, $Gd_2O_3$, $LaF_3$, $PbTe$, $Sb_2O_3$, $SiO$, $SiN$, $Ta_2Os$, $ZnS$, $ZnSe$, $ZrO_2$, and $Na_3AlF_6$. In one embodiment, the layer is formed by alternately laminating $TiO_2$ and $SiO_2$. According to foregoing description, in one embodiment, the first multi-layered film structure 14 is an infrared reflecting multi-layered film or an ultraviolet-infrared reflecting multi-layered film, and the second multi-layered film structure 16 is an antireflective multi-layered film. Alternatively, the first multi-layered film structure 14 is an antireflective multi-layered film, and the second multi-layered film structure 16 is an infrared reflecting multi-layered film or an ultraviolet-infrared reflecting multi-layered film.

In addition to the above layers, a moisture barrier layer, an antistatic layer, electromagnetic thin layer, a selective absorbing-filtering layer, a bottom coating layer, a protective layer, and the combination thereof can be further formed.

One embodiment of the present disclosure is prepared by following steps. First, a material for an organic coating layer was formulated by mixed organic pigments (comprising 0.074 parts by weight of SQL-1, 0.042 parts by weight of NIR-01 and 0.031 parts by weight of NIR-02 (all obtained from Orgchem Technologies, Inc.)) with 100 parts by weight of poly(methylacrylate)-based polymer (PT160512, Daxin Materials Co., Ltd.) homogeneously. The material for an organic coating layer with its T50 between 630 nm and 680 nm and an average transmittance ($T_{avg}$) less than 8% at wavelength range of from 700 nm to 725 nm is uniformed coated on the absorbing type infrared filtering medium by spin coating. Then, the material for organic coating layer is heated to be cured at 140° C. (±2° C.) for 30 minutes to form an organic coating layer with a thickness of 2 μm. Thereafter, a first multi-layered film structure is formed on the organic coating layer by electron gun evaporation with ion-source-assisted, and a second multi-layered film structure is formed by electron gun evaporation with ion-source-assisted on the second surface of the absorbing type infrared filtering medium, wherein said first multi-layered film structure is formed by alternating evaporation of $TiO_2$ and $SiO_2$ with the thickness of from 10 nm to 200 nm to obtain a first multi-layered film which has the total number of layers is 24 and a total thickness of 2,600 nm; and the second multi-layered film structure is formed by alternating evaporation of $TiO_2$ and $SiO_2$ with the thickness of from 10 nm to 200 nm to obtain a second multi-layered film which has the total number of layers is 18 and a total thickness of 2,300 nm.

In another embodiment of the present disclosure, the second multi-layered film structure may be firstly formed on the second surface of the absorbing type infrared filtering medium by the method described above, and then a material for the organic coating layer is coated on the first surface of the absorbing type infrared filtering medium by spin coating, followed by heated at 140° C. (±2° C.) for 30 minutes to form an organic coating layer. Finally, the first multi-layered film structure is formed on the organic coating layer by an evaporation method.

Figure 1B:
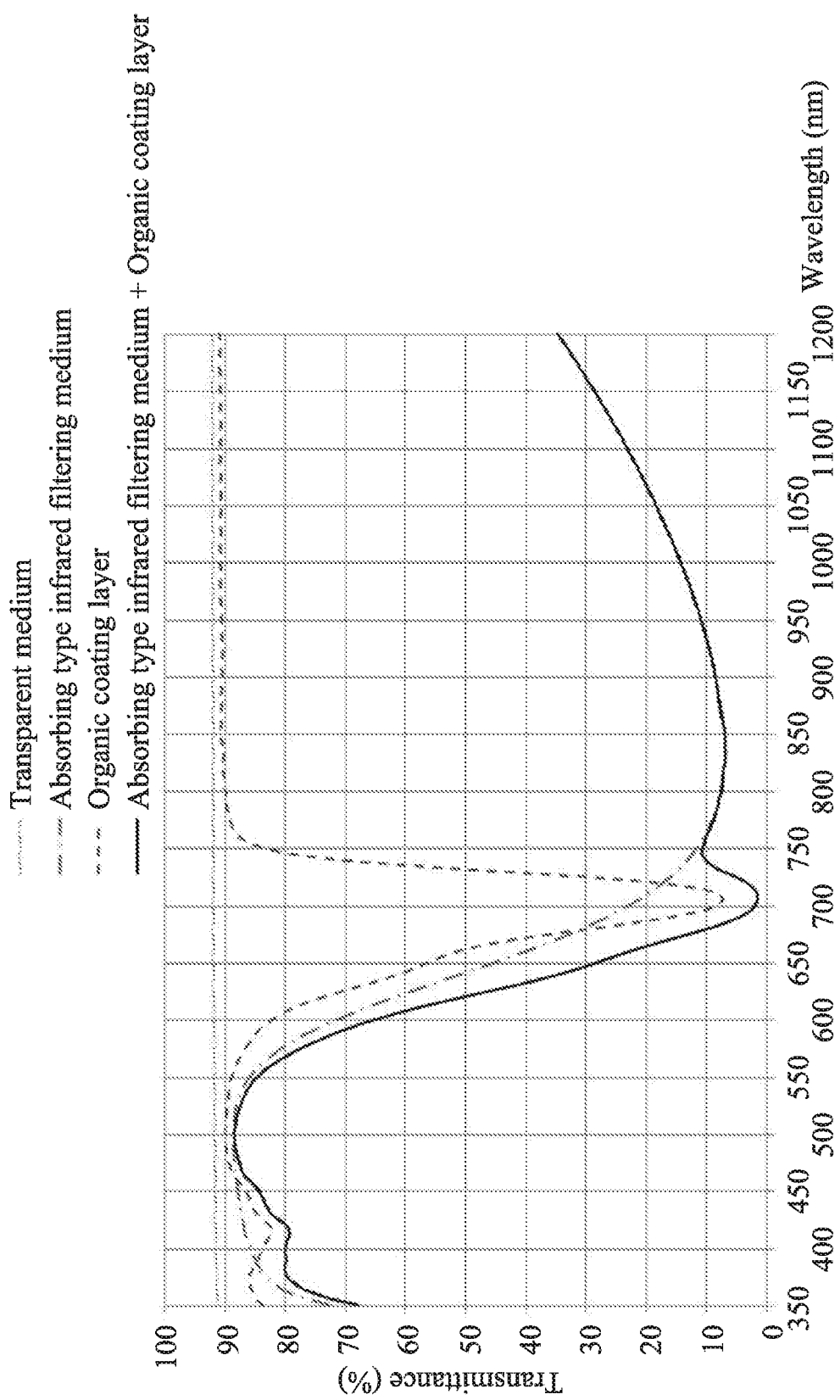
FIG. 1B is a graph showing spectral transmittance (T %) curves of various light filtering mediums.

Referring to FIG. 1B, it is a graph showing spectral transmittance (T %) curves of various light filtering medium. The curves were detected by Hitachi-U4100variable angle spectrometer. A known transparent medium has a transmittance above 90% for full wavelength; an absorbing type infrared filtering medium still has a transmittance of 40% for wavelength of from 650 nm to 1200 nm, while an organic coating layer has a transmittance below 8% for wavelength of 700 nm without absorbing light with wavelength of from 850 nm to 1200 nm. By cooperating with the organic coating layer, the absorbing type infrared filtering medium of the present disclosure can effectively reduce the transmittance for wavelength of 700 nm, and can absorb infrared ray of from 700 nm 1200 nm.

The present disclosure further provides a comparative example. The infrared absorption filter and organic coating layer were formed as the method described above, and the central wavelength of the coating film of the comparative example is at 680 nm. Referring to FIG. 4, it shows spectral transmittance (T %) curves at 620 nm to 700 nm of the near-infrared absorbing filter of the present disclosure and the comparative example at different degrees (0 degree and 30 degree).

In the embodiment, the near-infrared absorbing filter of the present disclosure having the coating film with a central wavelength at 710 nm significantly reduced the wavelength difference of the incident light within the range of from 0 to 30 degrees, and thereby effectively overcome the problem of color shifts at various degrees.

The table below shows the comparison of the datum of T50, T20 wavelengths and transmittance of the near-infrared absorbing filter shown in FIG. 1C, the reflecting type filter shown in FIG. 2B, the well-known absorbing infrared filter shown in FIG. 3B wherein the central wavelength of the coating film is 690 nm, the well-known absorbing infrared filter shown in FIG. 3C wherein the central wavelength of the coating film is 710 nm, and the absorbing infrared filter of the comparative example wherein the central wavelength of the coating film is 680 nm at different angles (0 and 30 degrees).

| Incident angle | Bare sheet T50 (nm) | T20 (nm) | Transmittance at 700 nm (T %) | Average transmittance at 700-725 nm ($T_{avg}$) | Average transmittance at 600-700 nm ($T_{avg}$) | Average transmittance at 600-700 nm ($T_{avg}$) ratio |
|---|---|---|---|---|---|---|
| Reflecting type filter (the central wavelength of the coating film is 650 nm) | | | | | | |
| 0 degree | 650 | 657 | 0.1 | 0.07 | 52.32 | 0.49 |
| 30 degrees | 624 | 632 | 0.03 | 0.02 | 25.75 | |
| Well known absorbing type infrared filter (the central wavelength of the coating film is 690 nm) | | | | | | |
| 0 degree | 650 | 687 | 2.94 | 0.76 | 48 | 0.77 |
| 30 degrees | 645 | 662 | 0.1 | 0.04 | 37 | |
| Well-known absorbing type infrared filter (the central wavelength of the coating film is 710 nm) | | | | | | |
| 0 degree | 650 | 704 | 24.2 | 10.12 | 50.62 | 0.86 |
| 30 degrees | 646 | 678 | 1.1 | 0.13 | 43.6 | |
| The near-infrared absorbing filter of the present disclosure (the central wavelength of the coating film is 710 nm) | | | | | | |
| 0 degree | 625 | 666 | 2.25 | 1 | 32.6 | 0.92 |
| 30 degrees | 623 | 663 | 0.08 | 0.02 | 29.85 | |
| The near-infrared absorbing filter of the comparative example (the central wavelength of the coating film is 680 nm) | | | | | | |
| 0 degree | 625 | 666 | 0.06 | 0.02 | 31.50 | 0.79 |
| 30 degrees | 623 | 647 | 0 | 0 | 24.84 | |

Figure 1C:
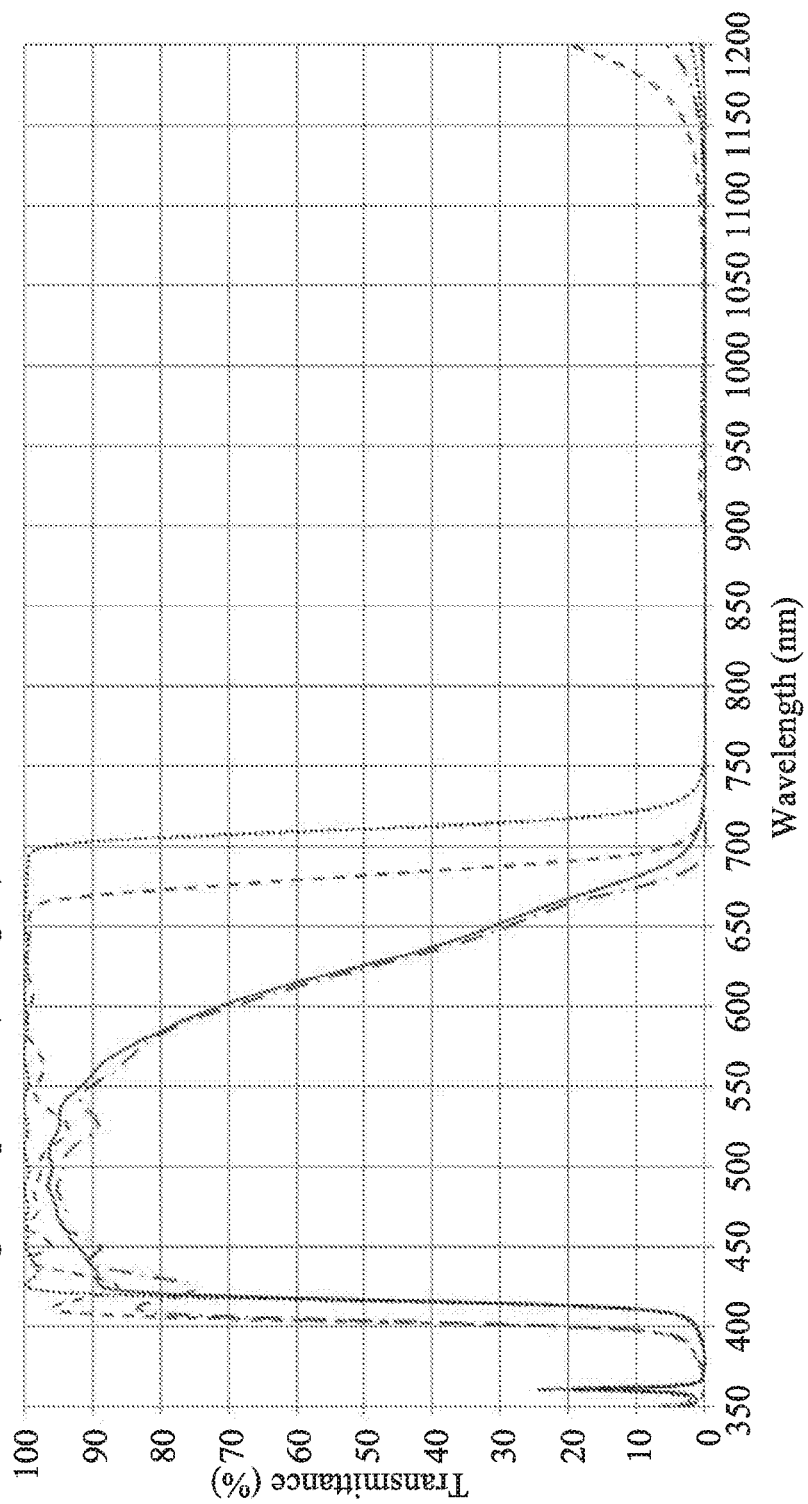
FIG. 1C is a graph showing spectral transmittance (T %) curves of the near-infrared absorbing filter of the present disclosure at different degrees (0 degree and 30 degrees), wherein the central wavelength of the coating film at 0 degree is 710 nm.
Figure 2A:
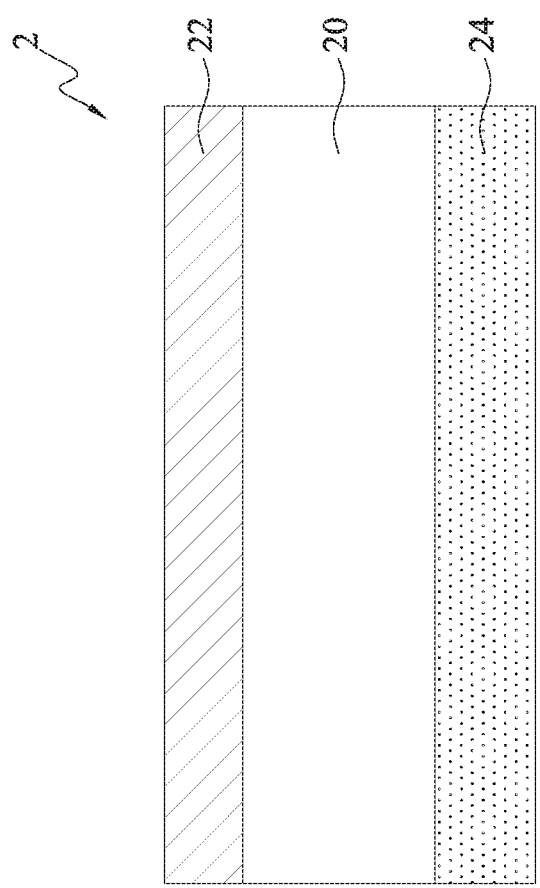
FIG. 2A is a diagram showing the structure of a reflecting type infrared filter.
Figure 2B:
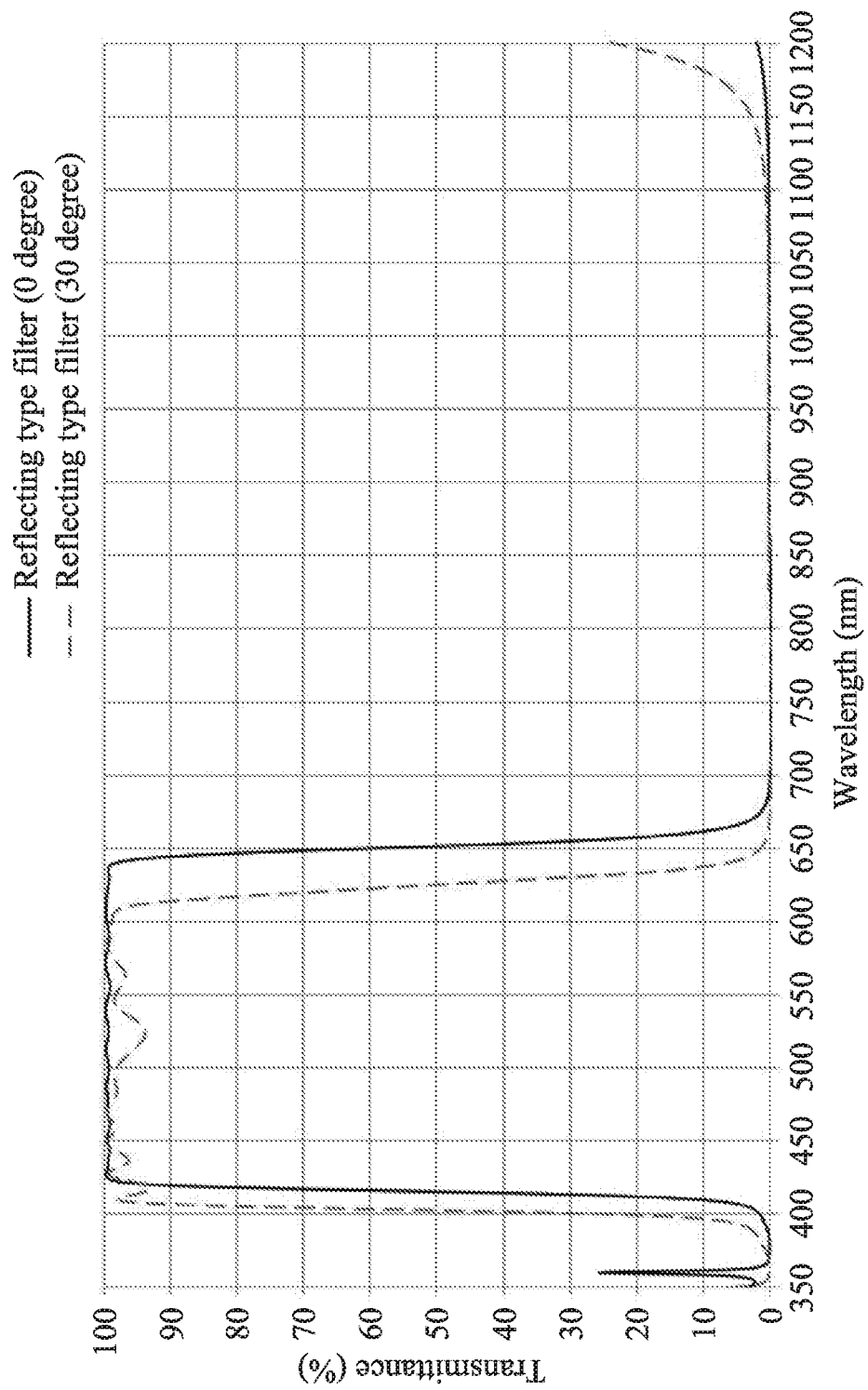
FIG. 2B is a graph showing spectral transmittance (T %) curves of the reflecting type infrared filter at different degrees (0 degree and 30 degrees), wherein the central wavelength of the coating film at 0 degree is 650 nm.
Figure 2C:
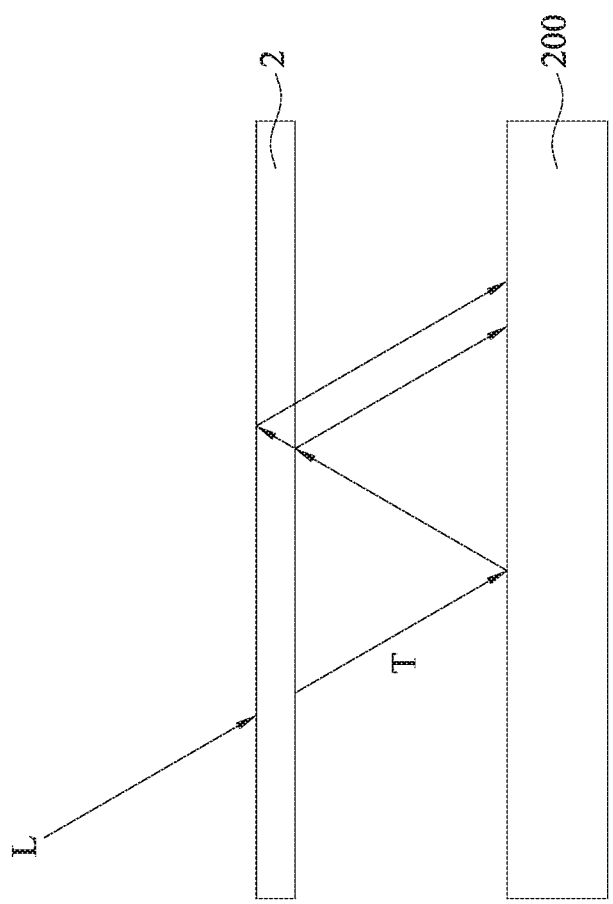
FIG. 2C is a diagram showing that a reflecting type infrared filter is applied in an image sensor.

FIG. 1C is a graph showing spectral transmittance (T %) curve of the near-infrared absorbing filter of the present disclosure, the near-infrared absorbing filter of the present disclosure is able to reduce average transmittance for wavelength of from 700 nm to 725 nm to 1% and further effectively reduce the transmittance difference for wavelength of 700 nm to less than 3%. Additionally, the central wavelength of the coating film can be adjusted to a wavelength range of from 700 to 730 nm, for example, FIG. 1C is a graph showing that the central wavelength of the coating film is 710 nm. Also, by disposing an organic coating layer, the wavelength differences at 0 to 30 degrees are effectively decreased, e.g., wavelength difference of T50 and T20 at 0 to 30 degrees to less than 5 nm. Thus, color shift at various angles is successfully overcome, and the infrared ray ghost images caused by reflection are further solved by an infrared rays absorbing type filter glass.

In addition, although the color shift for wavelength range of from 600 to 700 nm shown in FIG. 3C is better than that shown in FIG. 3B in which the central wavelength of the coating film is adjusted to 690 nm, the average transmittance for wavelength of from 700 to 725 nm clearly increases to 10.12, i.e., near infrared rays passed through the filter and ghost images occurred.

Furthermore, compared to prior art, the near-infrared absorbing filter of the present disclosure has a low average transmittance for wavelength within 700 nm to 725 nm which effectively reduce infrared ray ghost images, the difference of average transmittance for wavelength within 600 nm to 700 nm at 0 and 30 degrees was reduced. This suggests that there is lower color shift for the near-infrared absorbing filter of the present disclosure compared to filters of prior art which overcome the problem of color shifts at various degrees.

Figure 1D:
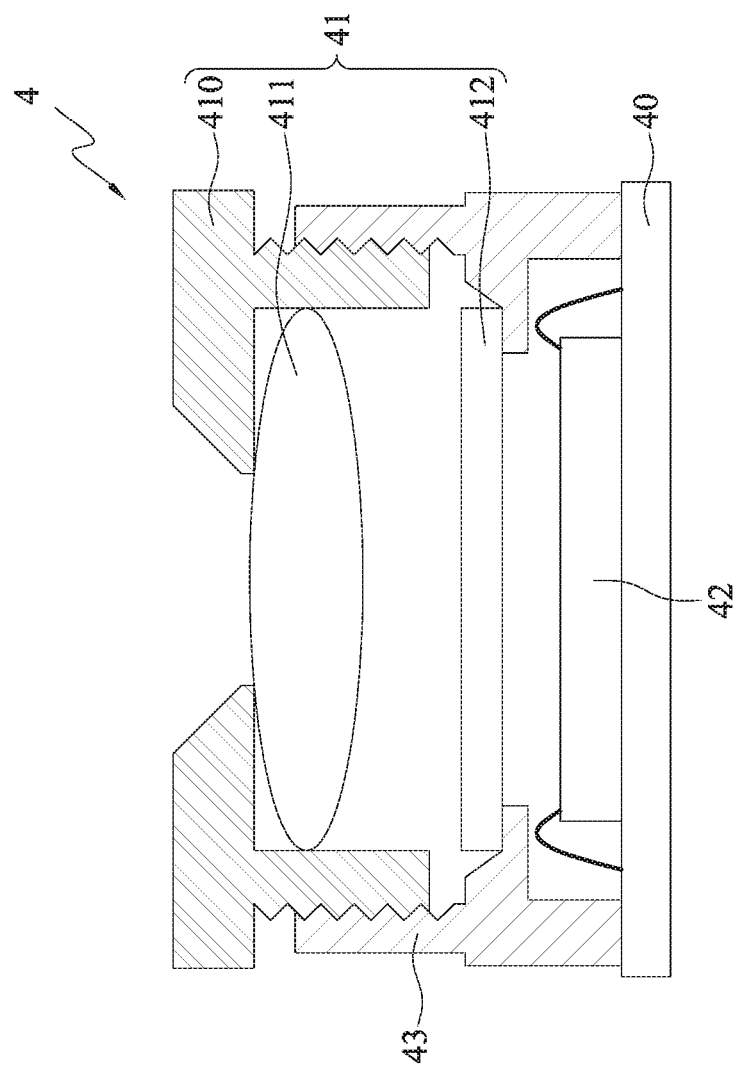
FIG. 1D is a diagram showing the structure of the image sensor of the present disclosure.

According to the description above, the present disclosure further provides an image sensor as shown in FIG. 1D, wherein the image sensor 4 comprises a substrate 40, a lens module 41, an image sensing element 42 and an outer housing 43.

The lens module 41 includes an inner housing 410, and a lens 411 and a near-infrared absorbing filter 412 of the present disclosure both disposed in the inner housing 410, wherein the near-infrared absorbing filter 412 is disposed on the light transmission path of the lens 411. The image sensing element 42 is disposed at one side of the lens module 41 and electrically connected to the substrate 40 such as by the mean of wire bonding so as to dispose the near-infrared absorbing filter between the lens and the image sensing element.

The foregoing embodiments are used for the purpose of illustrating the mechanisms and effects only rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A near-infrared absorbing filter, comprising:
an absorbing type infrared filtering medium having opposite first and second surfaces;
an organic coating layer formed on the first surface of the absorbing type filtering medium and configured to absorb infrared rays, wherein the organic coating layer has a central wavelength (T50) between 630 nm and 680 nm and has an average transmission ($T_{avg}$) of less than 8% for wavelength in a range of from 700 nm to 725 nm;
a first multi-layered film structure formed on the organic coating layer with the organic coating layer disposed between the first multi-layered film structure and the absorbing type infrared filtering medium, wherein the central wavelength of the first multi-layered film structure is between 700 nm and 730 nm; and
a second multi-layered film structure formed on the second surface of the absorbing type infrared filtering medium, wherein the central wavelength of the second multi-layered film structure is between 700 nm and 730 nm.

2. The near-infrared absorbing filter of claim 1, wherein the absorbing type infrared filtering medium comprises at least one of $P_2O_5$ and CuO.

3. The near-infrared absorbing filter of claim 1, wherein the absorbing type infrared filtering medium is phosphate-based infrared filter glass.

4. The near-infrared absorbing filter of claim 3, wherein the phosphate-based infrared filter glass is fluorophosphate-based infrared filter glass.

5. The near-infrared absorbing filter of claim 4, wherein the fluorophosphate-based infrared filter glass comprises at least one of $P_2O_5$ and CuO.

6. The near-infrared absorbing filter of claim 4, wherein the fluorophosphate-based infrared filter glass has at least one fluoride selected from the group consisting of $AlF_3$, LiF, $MgF_2$, $CaF_2$, $SrF_2$, and $BaF_2$.

7. The near-infrared absorbing filter of claim 1, wherein the absorbing type infrared filtering medium has a thickness of from 0.15 mm to 1.5 mm.

8. The near-infrared absorbing filter of claim 1, wherein the organic coating layer has a thickness of from 0.1 μm to 10 μm.

9. The near-infrared absorbing filter of claim 1, wherein the organic coating layer comprises at least one of an organic pigment and a polymer.

10. The near-infrared absorbing filter of claim 9, wherein the organic pigment is at least one selected from the group consisting of an azo compound, a diimmonium compound, a dithiophenol-metal complex, a phthalocyanine compound, a squaraine compound, and a cyanine compound.

11. The near-infrared absorbing filter of claim 9, wherein the polymer is at least one selected from the group consisting of polyester, polyacrylate, polyolefin, polycarbonate, polycycloolefin, polyurethane, epoxy, polyether, and polyvinyl butyral.

12. The near-infrared absorbing filter of claim 1, wherein at least one of the first multi-layered film structure and the second multi-layered film structure is one selected from the group consisting of an infrared reflecting multi-layered film, an ultraviolet-infrared reflecting multi-layered film, and an antireflective multi-layered film.

13. The near-infrared absorbing filter of claim 1, wherein each of the first multi-layered film structure and the second multi-layered film structure comprises 4 to 50 layers of films.

14. The near-infrared absorbing filter of claim 13, wherein each layers of the films is composed of at least one material selected from the group consisting of $TiO_2$, $SiO_2$, $Y_2O_3$, $MgF_2$, $Al_2O_3$, $Bi_2O_3$, $Gd_2O_3$, $LaF_3$, $Nb_2O_5$, $AlF_3$, PbTe, $Sb_2O_3$, SiO, SiN, $Ta_2O_5$, ZnS, ZnSe, $ZrO_2$, and $Na_3AlF_6$.

15. The near-infrared absorbing filter of claim 13, wherein each layers of the films is composed of $TiO_2$ and $SiO_2$ alternately laminated to each other.

16. The near-infrared absorbing filter of claim 1, wherein at least one of the first multi-layered film structure and the second multi-layered film structure has a thickness of from 0.2 μm to 5 μm.

17. An image sensor, comprising:
a lens module comprising a lens and the near-infrared absorbing filter of claim 1 arranged on a light transmission path of the lens; and an image sensing element disposed at one side of the lens module with the near-infrared absorbing filter disposed between the lens and the image sensing element.

* * * * *